United States Patent
Clark

(10) Patent No.: US 8,180,210 B2
(45) Date of Patent: *May 15, 2012

(54) WIRELESS CAMERA FLASH SYNCHRONIZER SYSTEM AND METHOD

(75) Inventor: James E. Clark, South Burlington, VT (US)

(73) Assignee: Lab Partners Associates, Inc., South Burlington, VT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/169,413

(22) Filed: Jun. 27, 2011

(65) Prior Publication Data

US 2011/0268432 A1    Nov. 3, 2011

Related U.S. Application Data

(63) Continuation of application No. 12/762,811, filed on Apr. 19, 2010, now Pat. No. 7,970,267, which is a continuation of application No. 12/250,914, filed on Oct. 14, 2008, now Pat. No. 7,702,228, which is a continuation of application No. 11/697,241, filed on Apr. 5, 2007, now Pat. No. 7,437,063.

(60) Provisional application No. 60/790,355, filed on Apr. 7, 2006.

(51) Int. Cl.
*G03B 17/00* (2006.01)
*H04N 5/232* (2006.01)

(52) U.S. Cl. .................. 396/56; 396/59; 348/211.2

(58) Field of Classification Search .............. 396/56–59, 396/263, 429, 661; 348/14.02, 14.05, 114, 348/211.2, 211.3, 211.4, 211.11, 211.14, 348/211.99, 725, 734
See application file for complete search history.

(56) References Cited

U.S. PATENT DOCUMENTS

| | | |
|---|---|---|
| 3,039,375 A | 6/1962 | Umbach |
| 3,185,056 A | 5/1965 | Gold et al. |

(Continued)

FOREIGN PATENT DOCUMENTS

EP    984320    8/1999

(Continued)

OTHER PUBLICATIONS

Nikon D2H Review: 1. Introduction: Digital Photography Review, Nikon D2H Review, Dec. 2003, Phil Askey; http://www.dpreview.com/reviews/NikonD2H/; last viewed on Mar. 18, 2008.

(Continued)

*Primary Examiner* — Rochelle-Ann J Blackman
(74) *Attorney, Agent, or Firm* — Downs Rachlin Martin PLLC

(57) ABSTRACT

A single oscillator synchronizer system and method that automatically switches from a wireless receive mode of the oscillator to a wireless transmit mode of the oscillator upon the detection of a synchronization (synch) signal of a camera body. In one example, a method of wirelessly communicating a camera synchronization from a camera body to a remote device with a wireless camera flash synchronizer connected to a synchronization connector of the camera body, the wireless camera flash synchronizer including a transceiver having an oscillator element with a wireless receive mode and a wireless transmit mode, the oscillator element configured to be in only one of the wireless receive mode and wireless transmit mode at a time is provided. In another example, a wireless camera flash synchronizer that automatically switches from a wireless receive mode to a wireless transmit mode upon detection of a synch signal of a camera body is provided.

20 Claims, 3 Drawing Sheets

U.S. PATENT DOCUMENTS

| | | | |
|---|---|---|---|
| 4,355,309 | A | 10/1982 | Hughey et al. |
| 4,470,804 | A | 9/1984 | Geijer et al. |
| 4,482,895 | A | 11/1984 | Weinberg |
| 4,509,845 | A | 4/1985 | Mizokami |
| 4,603,954 | A | 8/1986 | Egawa et al. |
| 4,636,052 | A | 1/1987 | Bowsher |
| 4,693,582 | A | 9/1987 | Kawamura et al. |
| 4,816,850 | A | 3/1989 | Philipeaux et al. |
| 4,816,855 | A | 3/1989 | Kitaura et al. |
| 4,884,094 | A | 11/1989 | Kitaura et al. |
| 4,988,584 | A | 1/1991 | Shaper |
| 5,159,375 | A | 10/1992 | Taniguchi et al. |
| 5,283,610 | A | 2/1994 | Sasaki |
| 5,299,012 | A | 3/1994 | Tsuruta et al. |
| 5,359,375 | A | 10/1994 | Clark |
| 5,422,543 | A | 6/1995 | Weinberg |
| 5,436,531 | A | 7/1995 | Weinberg |
| 5,521,708 | A | 5/1996 | Beretta |
| 5,640,623 | A | 6/1997 | Sasaki |
| 5,692,223 | A | 11/1997 | Ichikawa et al. |
| 5,708,833 | A | 1/1998 | Kinney et al. |
| 5,721,971 | A | 2/1998 | Sasaki |
| 5,754,898 | A | 5/1998 | Nakano |
| 6,006,039 | A | 12/1999 | Steinberg et al. |
| 6,088,542 | A | 7/2000 | Yandi et al. |
| 6,127,940 | A | 10/2000 | Weinberg |
| 6,167,199 | A | 12/2000 | Fukui |
| 6,278,481 | B1 | 8/2001 | Schmidt |
| 6,351,610 | B1 | 2/2002 | Numako et al. |
| 6,353,711 | B1 | 3/2002 | Numako et al. |
| 6,366,737 | B1 | 4/2002 | Numako et al. |
| 6,404,987 | B1 | 6/2002 | Fukui |
| 6,453,154 | B1 | 9/2002 | Haber et al. |
| 6,618,557 | B1 | 9/2003 | Ziemkowski |
| 6,683,654 | B1 | 1/2004 | Haijima |
| 6,718,135 | B2 | 4/2004 | Kawasaki et al. |
| 6,748,165 | B2 | 6/2004 | Ogasawara |
| 6,778,764 | B2 | 8/2004 | Barghini et al. |
| 6,798,986 | B2 | 9/2004 | Hagiuda |
| 6,941,067 | B2 | 9/2005 | Muramatsu |
| 7,016,603 | B2 | 3/2006 | Clark |
| 7,035,534 | B2 | 4/2006 | Shih et al. |
| 7,133,607 | B2 | 11/2006 | Clark |
| 7,184,658 | B2 | 2/2007 | Squillace |
| 7,362,965 | B2 | 4/2008 | Clark |
| 7,437,063 | B2 | 10/2008 | Clark |
| 7,702,228 | B2 | 4/2010 | Clark |
| 7,970,267 | B1 * | 6/2011 | Clark ............................. 396/56 |
| 2001/0042149 | A1 | 11/2001 | Ito et al. |
| 2002/0009296 | A1 | 1/2002 | Shaper et al. |
| 2002/0067425 | A1 | 6/2002 | Iverson |
| 2002/0067923 | A1 | 6/2002 | Fujimura |
| 2002/0127019 | A1 | 9/2002 | Ogasawara |
| 2003/0193588 | A1 | 10/2003 | Yuen et al. |
| 2004/0036774 | A1 | 2/2004 | Nichols et al. |
| 2004/0101295 | A1 | 5/2004 | Clark |
| 2005/0006484 | A1 | 1/2005 | Ito |
| 2005/0174434 | A1 | 8/2005 | Chang et al. |
| 2006/0093341 | A1 | 5/2006 | Clark |
| 2006/0275024 | A1 | 12/2006 | McNary |
| 2007/0058959 | A1 | 3/2007 | Clark |
| 2007/0066162 | A1 | 3/2007 | Zheng |
| 2007/0070206 | A1 | 3/2007 | Clark |
| 2007/0237510 | A1 | 10/2007 | Clark |
| 2008/0065137 | A1 | 3/2008 | Boucher et al. |
| 2008/0065139 | A1 | 3/2008 | Scribner et al. |
| 2008/0193114 | A1 | 8/2008 | Clark |
| 2008/0298792 | A1 | 12/2008 | Clark |
| 2008/0298793 | A1 | 12/2008 | Clark |
| 2009/0034952 | A1 | 2/2009 | Clark |

FOREIGN PATENT DOCUMENTS

| | | |
|---|---|---|
| JP | 63-018874 | 1/1988 |
| JP | 5093948 | 4/1993 |
| JP | 2002-244193 | 8/2002 |
| JP | 2002318413 | 10/2002 |
| JP | 2004-072230 | 3/2004 |
| JP | 2007067870 | 3/2007 |
| WO | 9638925 | 12/1996 |
| WO | 2007118201 | 10/2007 |
| WO | 2008150902 | 12/2008 |
| WO | 2008150904 | 12/2008 |

OTHER PUBLICATIONS

Nikon D2H Review: 15. Wireless: Digital Photography Review, Wireless; http://wwww.dpreview.com/reviews/NikonD2H/page 15.asp; last viewed on Mar. 18, 2008.

Related U.S. Appl. No. 10/306,759, filed Nov. 26, 2002, now U.S. Patent No. 7,016,603.

Related U.S. Appl. No. 11/305,668, filed Dec. 16, 2005, now U.S. Patent No. 7,133,607.

Related U.S. Appl. No. 11/529,203, filedSep. 27, 2006, now U.S. Patent No. 7,362,965.

Related U.S. Appl. No. 12/104,950, filed Apr. 17, 2008.

Related U.S. Appl. No. 11/490,322, filed Jul. 20, 2006.

Related U.S. Appl. No. 11/697,241, filed Apr. 5, 2007.

Related U.S. Appl. No. 12/129,447, filed May 29, 2008.

Office Action mailed Aug. 29, 2003, in related U.S. Appl. No. 10/306,759, now U.S. Patent No. 7,016,603.

Response to First Office Action dated Dec. 18, 2003, in related U.S. Appl. No. 10/306,759, now U.S. Patent No. 7,016,603.

Examiner Interview Summary dated Dec. 24, 2003, in related U.S. Appl. No. 10/306,759, now U.S. Patent No. 7,016,603.

Final Office Action dated Mar. 27, 2004, in related U.S. Appl. No. 10/306,759, now U.S. Patent No. 7,016,603.

Examiner Interview Summary dated Apr. 15, 2004, in related U.S. Appl. No. 10/306,759, now U.S. Patent No. 7,016,603.

Response to Final Office Action dated Apr. 20, 2004, in related U.S. Appl. No. 10/306,759, now U.S. Patent No. 7,016,603.

Third Office Action dated Aug. 24, 2004, in related U.S. Appl. No. 10/306,759, now U.S. Patent No. 7,016,603.

Request for Continued Examination dated Feb. 18, 2005, in U.S. Appl. No. 10/306,759, filed Nov. 26, 2002, now U.S. Patient No. 7,016,603.

First Office Action after Request for Continued Examination dated Mar. 29, 2005, in related U.S. Appl. No. 10/306,759, now U.S. Patent No. 7,016,603.

Response to First Office Action Request for Continued Examination dated Apr. 14, 2005, in related U.S. Appl. No. 10/306,759, now U.S. Patent No. 7,016,603.

Second Office Action after Request for Continued Examination dated Jun. 29, 2005, in related U.S. Appl. No. 10/306,759, now U.S. Patent No. 7,016,603.

Response to Second Office Action after Request for Continued Examination dated Aug. 25, 2005, in related U.S. Appl. No. 10/306,759, now U.S. Patent No. 7,016,603.

Notice of Allowance dated Sep. 16, 2005, in related U.S. Appl. No. 10/306,759, now U.S. Patent No. 7,016,603.

312 Amendment dated Oct. 10, 2005, in U.S. Appl. No. 10/306,759, filed Nov. 26, 2002, now U.S. Patent No. 7,016,603.

First Office Action dated Mar. 8, 2006, in related U.S. Appl. No. 11/305,668, now U.S. Patent No. 7,133,607.

Response to First Office Action dated Jun. 8, 2006, in related U.S. Appl. No. 11/305,668, now U.S. Patent No. 7,133,607.

Notice of Allowance dated Jun. 30, 2006, in related U.S. Appl. No. 11/305,668, now U.S. Patent No. 7,133,607.

Request for Correction of Letters Patent dated Mar. 29, 2007, in U.S. Patent No. 7,133,607.

Supplemental Response to Request for Clarification by the Examiner dated Jun. 13, 2006, in U.S. Appl. No. 11/305,688, filed Dec. 16, 2005, now U.S. Patent No. 7,133,607.

First Office Action dated Aug. 14, 2007, in related U.S. Appl. No. 11/529,203, now U.S. Patent No. 7,362,965.

Response to First Office Action and Terminal Disclaimer dated Oct. 16, 2007, in related U.S. Appl. No. 11/529,203, now U.S. Patent No. 7,362,965.

Terminal Disclaimer dated Oct. 25, 2007, in related U.S. Appl. No. 11/529,203, now U.S. Patent No. 7,362,965.

Notice of Allowance dated Dec. 14, 2007, in related U.S. Appl. No. 11/529,203, now U.S. Patent No. 7,362,965.
First Office Action dated Oct. 16, 2007 in related U.S. Appl. No. 11/488,491.
International Search Report and Written Opinion mailed Feb. 12, 2008, in International Application No. PCT/US2006/028229.
International Search Report and Written Opinion dated Nov. 9, 2007, in related International Application No. PCT/US2007/66162.
International Search Report and Written Opinion dated May 29, 2007, in related International Application No. PCT/US2008/065139.
International Search Report and Written Opinion dated May 29, 2007, in related International Application No. PCT/US2008/065137.
Pocketwizard MultiMax Transceiver Owner's Manual, by LPA Design, May 2001, pp. 1-55 and "Relay Mode" on p. 40, United States.
Technical Data Sheet for ADF7020-1 Transceiver IC, Analog Devices, Inc., 2005, pp. 1-44.
FlashWizard II Synchronizer, Affidavit of James E. Clark Regarding FlashWizard II Synchronizer.
Notice of First Office Action dated Nov. 8, 2007 in connection to related U.S. Appl. No. 11/697,241.
Response to First Office Action dated Mar. 10, 2008 in connection to related U.S. Appl. No. 11/697,241.
Examiner Interview Summary dated Mar. 24, 2008 in connection to related U.S. Appl. No. 11/697,241.
Notice of Allowance dated Jun. 9, 2008 in connection to related U.S. Appl. No. 11/697,241.
First Office Action dated Jun. 12, 2009 in connection with related U.S. Appl. No. 12/250,914.
Response to First Office Action dated Jun. 29, 2009 in connection with related U.S. Appl. No. 12/250,914.
Terminal Disclaimer dated Oct. 28, 2009 in connection with related U.S. Appl. No. 12/250,914.
Notice of Allowance dated Dec. 3, 2009 in connection with related U.S. Appl. No. 12/250,914.
Office Action dated Dec. 28, 2010 in related U.S. Appl. No. 12/762,611.
Response to Office Action dated Mar. 28, 2011 in related U.S. Appl. No. 12/762,611.
Terminal Disclaimer dated Mar. 28, 2011 in related U.S. Appl. No. 12/762,611.
Notice of Allowance dated Apr. 20, 2011 in related U.S. Appl. No. 12/762,611.

* cited by examiner

WIRELESS CAMERA FLASH SYNCHRONIZER SYSTEM AND METHOD

RELATED APPLICATION DATA

This application is continuation of U.S. patent application Ser. No. 12/762,811, filed Apr. 19, 2010, and titled "Wireless Camera Flash Synchronizer System and Method," now allowed, which is a continuation of U.S. patent application Ser. No. 12/250,914, filed Oct. 14, 2008, and titled "Wireless Camera Flash Synchronizer System and Method," now U.S. Pat. No. 7,702,228, issued Apr. 20, 2010, which is a continuation of U.S. patent application Ser. No. 11/697,241 filed Apr. 5, 2007, and titled "Wireless Camera Flash Synchronizer System and Method," now U.S. Pat. No. 7,437,063, issued Oct. 14, 2008, each of which is incorporated by reference herein in its entirety. This application also claims the benefit of priority of U.S. Provisional Patent Application Ser. No. 60/790,355, filed Apr. 7, 2006, and titled "Wireless Camera Flash Synchronizer System and Method, which is incorporated by reference herein in its entirety.

FIELD OF THE INVENTION

The present invention generally relates to the field of camera flash synchronization. In particular, the present invention is directed to a wireless camera flash synchronizer system and method.

BACKGROUND

Synchronization of a camera flash to the acquisition of an image can be done wirelessly between a camera and a remote flash device or other device requiring synchronization. Typically, prior synchronizers require a user to manually switch the device from a receive mode to a transmit mode utilizing a physical switch on the device. The speed demands imposed by cameras require near instantaneous transmission of a synchronization command to the remote device in order for the remote device to synchronize properly with the camera. Thus, synchronizers are typically manually set in the transmit mode to save the time of switching the synchronizer from a receive mode to a transmit mode upon a need to transmit. This type of setting requires a manual input to the synchronizer. One prior synchronizer, the FlashWizard II manufactured by LPA Design of South Burlington, Vt., includes separate radio circuits for transmitting and receiving (e.g., two separate oscillator elements, one for receive and one for transmit, that are both active at the same time). Having separate radio circuits can add to the cost of the synchronizer and increase power consumption.

SUMMARY OF THE DISCLOSURE

In one embodiment, a method of wirelessly communicating a camera synchronization from a camera body to a remote device with a wireless camera flash synchronizer connected to a synchronization connector of the camera body, the wireless camera flash synchronizer including a transceiver having an oscillator element with a wireless receive mode and a wireless transmit mode, the oscillator element configured to be in only one of the wireless receive mode and wireless transmit mode at a time is provided. The method includes setting the oscillator element to the wireless receive mode; detecting a synch signal from the synchronization connector of the camera body; in response to the detecting of the synch signal, automatically switching the oscillator element from the wireless receive mode to the wireless transmit mode; and wirelessly transmitting a synchronization data from the wireless camera flash synchronizer to the remote device.

In another embodiment, a wireless camera flash synchronizer is provided. The wireless camera flash synchronizer includes a transceiver having an oscillator element with a transmit mode and a receive mode, the oscillator element being in only one of the transmit mode and the receive mode at a time; a first synchronization signal connector for connecting the wireless camera flash synchronizer to a second synchronization signal connector of a camera body; and an auto mode switcher for switching the transceiver from the receive mode to the transmit mode in response to the first synchronization signal connector receiving a synch signal from the camera body.

In yet another embodiment, wireless camera flash synchronizer is provided. The wireless camera flash synchronizer includes a transceiver having an oscillator element having a transmit mode and a receive mode, the oscillator element being in only one of the transmit mode and the receive mode at a time; a means for connecting the wireless camera flash synchronizer to a synchronization signal connector of a camera body; and a means for switching the transceiver from the receive mode to the transmit mode in response to the means for connecting receiving a synch signal from the camera body.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

A single oscillator system and method is provided that automatically switches from a receive mode to a transmit mode upon the detection of a synchronization (synch) signal of a camera body.

Figure 1:
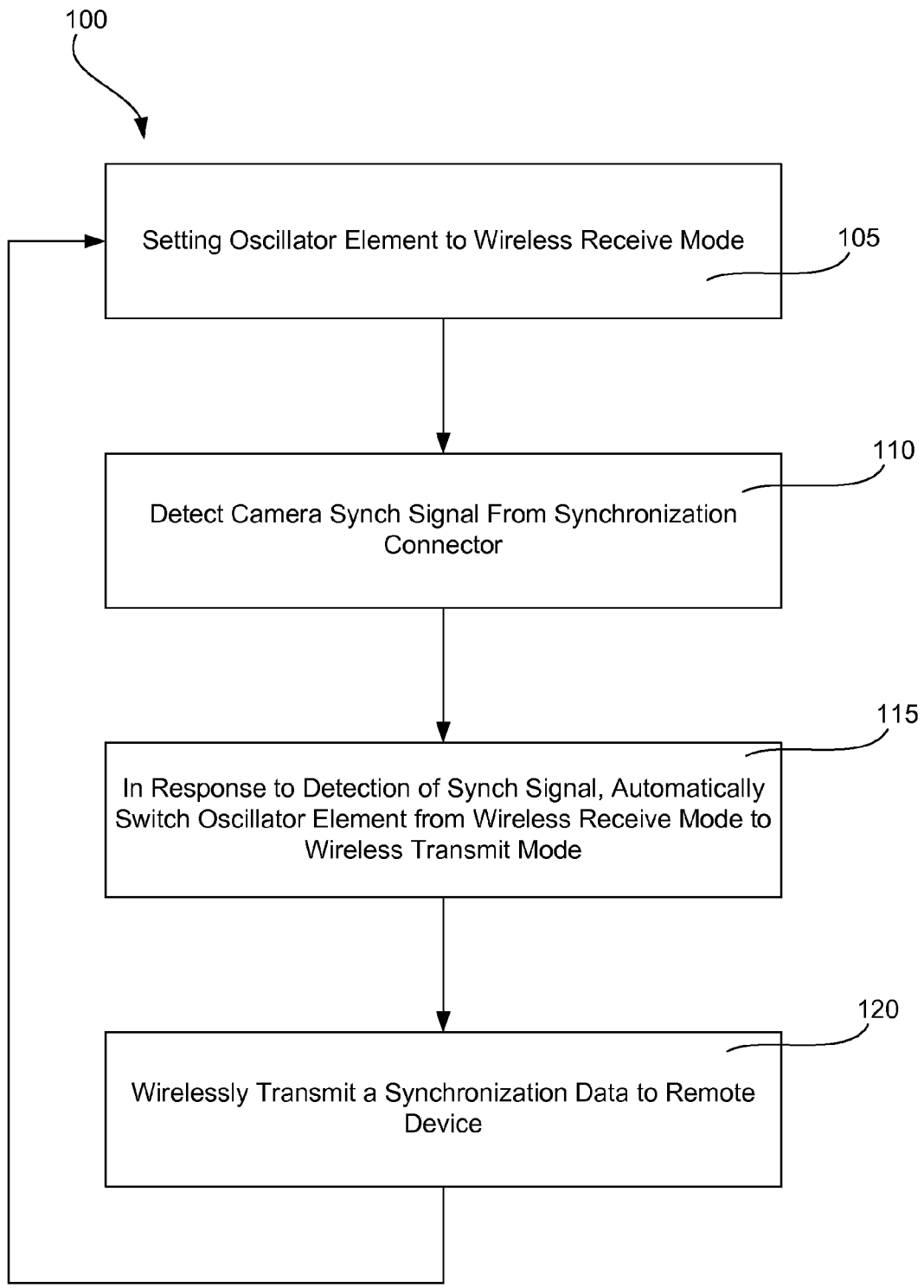
FIG. 1 illustrates one embodiment of a method of wirelessly communicating a camera synchronization to a remote device from a camera body.

FIG. 1 illustrates one embodiment of a method 100 of wirelessly communicating a camera synchronization to a remote device from a camera body. At step 105, an oscillator element of a wireless camera flash synchronizer is set to a receive mode. Various embodiments of a wireless camera flash synchronizer are set forth below (e.g., wireless camera flash synchronizer 200, 300 of FIGS. 2 and 3, respectively). A wireless camera flash synchronizer may be physically connected to the camera body in a variety of ways. In one example, a wireless camera flash synchronizer may be connected to a synchronization signal connector of the camera body. Examples of a synchronization signal connector include, but are not limited to, a camera hotshoe, a camera PC connector, a direct wiring to the internal circuitry of the camera body, and any combinations thereof. It should be noted that the term PC connector is well understood to those of ordinary skill to refer to a camera synchronization connector, such as a connector defined by the ISO 519 standard. The "PC" of this term does not refer to a personal computer.

A wireless camera flash synchronizer may include one or more oscillator elements. However, only one of the oscillator elements is utilized in the steps of method 100. For example, in addition to an oscillator element for wireless communication, a synchronizer may include an processing oscillator utilized by a processing element, but not used for wireless communication. An oscillator element may be included in a transceiver circuit. A variety of transceiver circuits suitable for use in a synchronizer according to the present disclosure will be known to those of ordinary skill from the description herein. Example transceiver circuits are discussed below. An oscillator element may include one or more oscillator circuits that are all utilized at a given time for either transmit or receive function. In one example, an oscillator element includes a single oscillator circuit that can be set to one of a wireless mode, including a wireless receive mode and a wireless transmit mode. In another example, an oscillator element includes two or more oscillator circuits that work together and can be set together to one of a wireless mode, including a wireless receive mode and a wireless transmit mode. In either of these examples, the oscillator element does not wirelessly transmit and receive at the same time.

The setting of the oscillator element to a receive mode (e.g., as in step 105) may occur in a variety of ways. In one example, the oscillator element is set to a receive mode as a default mode of the synchronizer (e.g., at power on of the synchronizer). In another example, the oscillator element is manually physically switched (e.g., utilizing a button or other physical switching device on the synchronizer) to a receive mode. In yet another example, the oscillator element is automatically switched to a receive mode after an event occurs, such as after the synchronizer transmits a wireless signal to a remote device. In still another example, a receive frequency coding is loaded into a transceiver having the oscillator element and latching the receive frequency coding into a register utilized by the transceiver for determining a frequency for wireless reception and/or a mode status for the transceiver. In such an example, a receive frequency coding may include one or more bits of data representing a frequency for reception and/or one or more bits of data representing that the transceiver (e.g., and its oscillator element) should be in a receive mode. Example signals that may be received by a synchronizer (e.g., from a remote device) include, but are not limited to, a confirmation of existence of a remote device, a confirmation of flash firing from a remote device, a trigger command to start the image acquisition process of the camera device from a remote trigger (e.g., a trigger in a remote light sensor, a wireless handheld trigger, etc.), and any combinations thereof. Having a synchronizer that can stay in a receive mode until a synch signal is received and then switch to a transmit mode is desirable. In one example, such a synchronizer eliminates the need for a physical transmit/receive control for manual actuation on the synchronizer device At step 110, a synch signal of the camera body is detected via the synchronization connector of the camera body to which the synchronizer is physically connected. A synch signal is a signal recognized by those skilled in the art. Typically, a synch signal is generated by a camera device after a trigger of the camera is activated and is utilized to synchronize a flash device (or other device) to the acquisition of an image (e.g., the open state of a shutter) by the camera. In one example, a synch signal is generated by a camera device at the point where a first curtain of a shutter reaches a fully open position. In another example, a camera device without a shutter may generate a synch signal at a point at or closely after the beginning of exposure of an exposure element (e.g., a CCD of a digital camera).

There may be a relatively great amount of time between the reception of a trigger to acquire an image (e.g., a trigger command received from a remote trigger or from the trigger of the camera body itself) and actual image acquisition. The receipt of a trigger command and the generation of a synch signal occur at different times in the image acquisition process. A synch signal is typically generated after a trigger command is provided.

Figure 2:
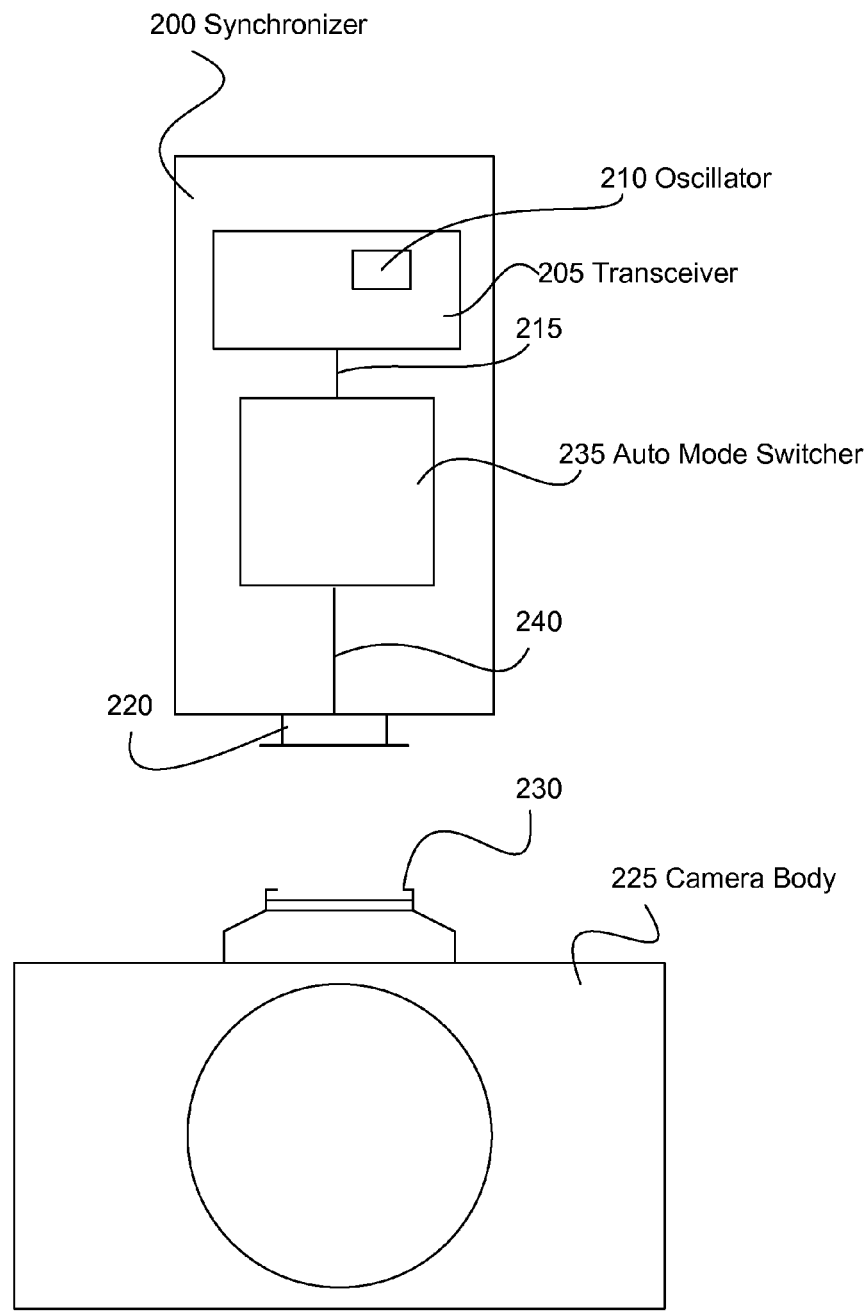
FIG. 2 illustrates one embodiment of a wireless camera flash synchronizer.
Figure 3:
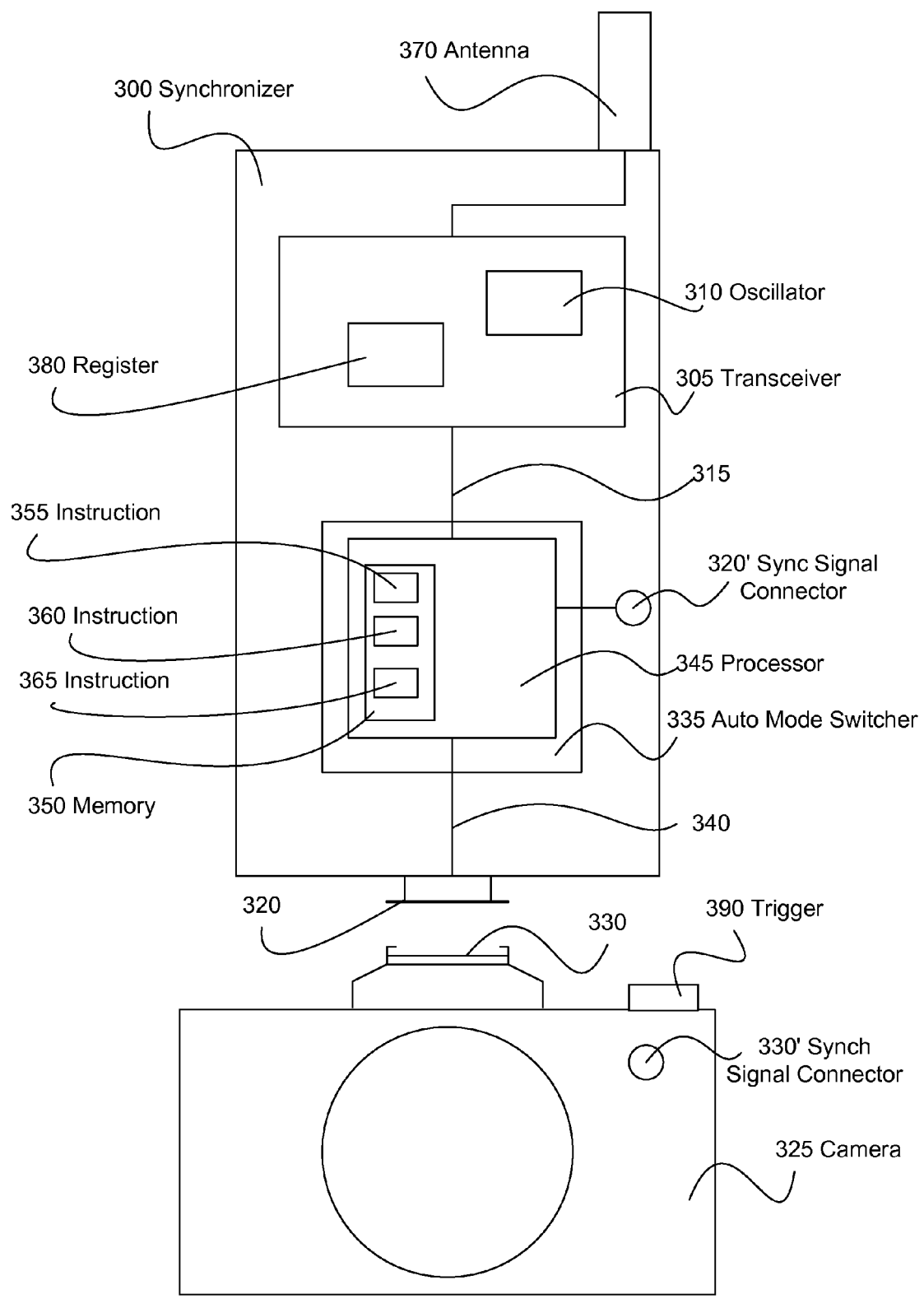
FIG. 3 illustrates another embodiment of a wireless camera flash synchronizer.

At step 115, in response to the detecting of the synch signal, the oscillator element is automatically switched from the receive mode to a transmit mode. An oscillator element may be switched from a receive mode to a transmit mode in a variety of ways that will be understood from the disclosure herein. In one example, a synchronizer, such as one of the exemplary synchronizers discussed below with respect to FIGS. 2 and 3, is configured with appropriate circuitry and/or machine executable instructions for automatically switching an oscillator element to a transmit mode upon detecting a synch signal via a physical connection of the synchronizer to a synchronization connector of a camera body. In another example, a transceiver having an oscillator element is loaded with a transmit frequency coding that may include data for setting an operating mode of the oscillator and/or transceiver. An exemplary transmit frequency coding may include an instruction to the oscillator/transceiver of a frequency of operation for transmission and/or an instruction to the oscillator/transceiver to operate in a transmit mode. Such instructions may include any number of one or more data bits. In yet another example, the loading of a transmit frequency coding occurs before a synch signal is detected (e.g., as in step 110). In still another example, a transmit frequency coding is latched into a register utilized by a transceiver to set an operating mode. In such an example, the latching may occur after the detection of the synch signal (e.g., during step 115).

The time from the point at which a synch signal is generated by a camera device to when a flash (or other remote device) must fire can be very fast. This time may depend on many variables. In one example, a camera device's image acquisition time is limited in part by the length of the opening of an aperture (e.g., time of shutter opening), or other limitation (e.g., programmed image acquisition time of a shutterless digital camera).

In one exemplary embodiment, it may be important to limit the amount of time between a synchronizer detecting a synch signal via a synchronization connector and the synchronizer being switched from receive mode to a transmit mode (e.g., the synchronizer being ready to wirelessly transmit an indicator of the synch signal to a remote device). In one example, being ready to wirelessly transmit a synch signal includes being ready to stably transmit on a particular transmit frequency. Any one of a variety of transmit frequencies may be used for transmission. In one example, a stable frequency state is indicated by a PLL (Phase Lock Loop) of the transceiver reaching a "lock" condition. A PLL lock may be measured when frequency error is sustained at a particular level. In one example, a phase lock may be detected when a frequency error is sustained at less than 20 kHz error. Other measures of frequency stability may be used to indicate that the synchronizer is in a transmit mode.

The time utilized from the detection of a synch signal to the completion of switching to a transmit mode may depend on a variety of factors (e.g., hardware and operating environment) and influence performance of the synchronizer in synchronizing a remote device with image acquisition. In one example, switching to a transmit mode (as in step 115) is completed in about 10 microseconds to about 1 millisecond. Performance of the synchronizer may be increased by decreasing the time necessary to switch to a transmit mode. Other example times for completion of switching to a transmit mode after detection of a synch signal include, but are not limited to, a switch completion time of less than about 1 millisecond, a switch completion time of less than about 500 microseconds, a switch completion time of less than about 200 microseconds, a switch completion time of less than about 100 microseconds, a switch completion time of less than about 20 microseconds, and a switch completion time of less than about 10 microseconds. Other example times for switching to a transmit mode include, but are not limited to, less than 1 millisecond, less than 100 microseconds, and less than 20 microseconds.

At step 120, a synchronization data is wirelessly transmitted from the synchronizer to a remote device. Optionally, after transmission, step 105 may be repeated and the oscillator element may be set again to a receive mode. In one example, this may occur at a predetermined time after the completion of the transmission to the remote device.

A synchronization data may be any information that can be wirelessly transmitted to a remote device to synchronize the remote device with the camera body to which the synchronizer is connected. Examples of synchronization include, but are not limited to, firing a flash at about the time of image acquisition by a camera device (e.g., firing the flash at least for some of the time that a shutter of the camera device is open), instigating image acquisition by a remote camera device in conjunction with the image acquisition of the camera device to which the synchronizer is connected, and any combinations thereof. Examples of synchronization data include, but are not limited to, one or more data elements based on a detected camera body synch signal, one or more data elements that include a detected camera body synch signal, and any combinations thereof.

For the sake of convenience, the present disclosure frequently discusses a remote device that is a flash device. However, it is contemplated that a remote device that may be synchronized by a wireless synchronizer of the present disclosure may include any one or more of a variety of remote devices. Examples of a remote device include, but are not limited to, a flash device, a non-flash lighting device, a remote camera device (e.g., a remote camera device to be synchronized with the operation of the camera body connected to the synchronizer), an exposure meter, and any combinations thereof. Example flash devices include, but are not limited to, an internal flash, external flash, local flash, and a remote flash device. In one example, a flash device may be internal, external, local, and/or remote to the camera device.

Depending on the mode of wireless transmission and the distance to the remote device, an amount of time passes during the transmission of the synchronization data to the remote device. In one example, the remote device (e.g., a flash device) then prepares to fire. In a flash device example, the flash fires over a specific amount of time.

FIG. 2 illustrates one embodiment of a synchronizer 200. Synchronizer 200 includes a transceiver 205 having an oscillator element 210 that has a receive mode and a transmit mode. Oscillator element 210 is configured to allow only one of the receive mode and the transmit mode at a time. Various transceivers suitable for use with a synchronizer of the present disclosure (e.g., synchronizer 200) will be recognized by those skilled in the art from a review of the present disclosure. One example of a transceiver includes a transceiver radio chip, model no. ADF7020-1, available from Analog Devices of Norwood, Mass. Another example of a transceiver includes a transceiver radio chip, model no. ADF7020, also available from Analog Devices. Yet another example of a transceiver includes a transceiver radio chip, model no. CC 1100 from ChipCon/TI. Still another example of a transceiver includes a transceiver radio chip, model no CC 1110 from ChipCon/TI.

Transceiver 205 may include one or more connectors 215 for communicating with the circuitry of the transceiver. Examples of a connector for communicating with a transceiver include, but are not limited to, a data connector (e.g., for communicating data to a transceiver for wireless transmission and/or for communicating data wirelessly received by a transceiver to a device, such as a processor; communicating instructions to a transceiver, etc.), a clock connector (e.g., for connecting to a clock of a processor), a latch connector (e.g., for receiving a latch instruction from a processor to latch one or more pieces of information), and any combinations thereof. One or more connectors 215 may include any electrical connector medium. In one example, one or more connectors 215 may include printed circuit board traces that connect circuit elements.

Synchronizer 200 also includes one or more synchronization signal connectors 220. As discussed above with respect to method 100 of FIG. 1, a synchronization signal connector is any connector that is configured to connect to a synchronization signal of a camera body (e.g., via a synchronization signal connector of the camera body). Examples of a synchronization signal connector include, but are not limited to, a camera hotshoe, a camera PC connector, a direct wiring to the internal circuitry of the camera body, multi-contact accessory ports that include synchronization signal, and any combinations thereof. Via such a connection, synchronizer 200 may detect a synch signal of camera body 225. Synchronizer 200 is shown as being connected to camera body 225 via a hotshoe connector 230 and synchronization signal connector 220. In such an example, synchronization signal connector 220 is configured to connect with hotshoe connector 230. As part of this configuration, synchronization signal connector 220 may include a male hotshoe assembly sized and shaped to mate with a hotshoe connector, such as hotshoe connector 230. In one example, a male hotshoe assembly may be positioned on and/or within an exterior casing of a synchronizer (e.g., synchronizer 200). It is contemplated that a synchronizer, such as synchronization signal connector 220 may include (e.g., in addition to a hotshoe configuration or as a replacement for a hotshoe configuration as shown in FIG. 2) a configuration that is sized and shaped to connect (directly and/or via a wire) to a PC connector of camera body 225. In one example, a PC connector configuration for synchronization signal connector 220 includes a standard female microphone jack. It is also contemplated that a synchronizer may be shaped and sized to be inserted (in its entirety or in part) within camera body 225. In one such example, synchronization signal connector 220 includes wiring and/or other circuitry for directly connecting synchronizer 200 to internal synchronization circuitry and/or wiring of camera body 225.

Transceiver 205 is in electrical communication with an auto mode switcher 235 via one or more of connectors 215. Auto mode switcher 235 is also electrically connected to synchronization signal connector 220 via connection 240. Auto mode switcher 235 includes circuitry and/or machine executable instructions for automatically switching oscillator 210 and/or transceiver 205 to a transmit mode when a synch signal is detected via synchronization signal connector 220. One exemplary embodiment of such circuitry and one exemplary embodiment of such machine executable instructions are described below with respect to synchronizer 300 of FIG.

3. Other embodiments and variants of such circuitry will be understood by those of ordinary skill from the present disclosure.

Auto mode switcher 235 is shown as being separate from transceiver 205. It is contemplated that all or part of the circuitry and/or machine executable instructions of auto mode switcher 235 may be part of transceiver 205.

Auto mode switcher 235 may be configured to automatically switch oscillator 210 and potentially other components of transceiver 205 from a receive mode to a transmit mode and to capable of transmission of synchronization data to a remote device within a specific amount of time of the detection of a synch signal from camera 225 via synchronization signal connector 220. In one example, auto mode switcher 235 is configured to switch to a transmit mode in less than about 1 millisecond of detection of a synch signal. In another example, auto mode switcher 235 is configured to switch to a transmit mode in less than about 500 microseconds of detection of a synch signal. In yet another example, auto mode switcher 235 is configured to switch to a transmit mode in less than about 200 microseconds of detection of a synch signal. In still another example, auto mode switcher 235 is configured to switch to a transmit mode in less than about 100 microseconds of detection of a synch signal. In still yet another example, auto mode switcher 235 is configured to switch to a transmit mode in less than about 20 microsecond of detection of a synch signal. In a further example, auto mode switcher 235 is configured to switch to a transmit mode in less than about 10 microsecond of detection of a synch signal. Other examples of configurations of auto mode switcher 235 include, but are not limited to, a configuration to switch to a transmit mode in less than 1 millisecond, a configuration to switch to a transmit mode in less than 100 microseconds, and a configuration to switch to a transmit mode in less than 20 microseconds.

In an alternative embodiment, synchronizer 200 may be configured to transmit a signal including information representing synchronization data, to a remote device utilizing a single modulated frequency for each transmission of data to the remote device. In one example, transceiver 205 may be instructed (e.g., via auto mode switcher 235) to utilize a single modulated frequency for a given channel of transmission. In one such example, transceiver 205 operates differently than a radio device utilizing spread spectrum technology. Spread spectrum technology often has inferior performance in sending a synch signal partly because of the time necessary for a spread spectrum technique to resynchronize the radio link with the remote receiver and the significant radio traffic on these spread spectrum bands.

FIG. 3 illustrates another embodiment of a synchronizer 300. Except where indicated, synchronizer 300 and its component elements includes aspects and features that are similar to those of synchronizer 200 of FIG. 2.

Synchronizer 300 includes a transceiver 305 having an oscillator element 310 that has a receive mode and a transmit mode. Oscillator element 310 is configured to allow only one of the receive mode and the transmit mode at a time. Transceiver 305 includes one or more connectors 315 for providing electrical communication to and/or from transceiver 305.

Synchronizer 300 also includes a synchronization signal connector 320. Here synchronization signal connector 320 is shown as a hotshoe connector for connecting to a camera body 325 via a hotshoe synchronization signal connector 330 of camera body 325. When synchronization signal connector 320 is connected to synchronization signal connector 330, it is possible to detect a synch signal of camera 325. Synchronizer 300 may also include a synchronization signal connector 320'. In one example, as shown in FIG. 3, synchronization signal connector 320' is configured to connect to a PC connector synchronization signal connector 330' of camera body 325. When synchronization signal connector 320' is connected to synchronization signal connector 330', it is possible to detect a synch signal of camera 325.

Transceiver 305 is electrically connected with an auto mode switcher 335 via connector 315. In one example, such an electrical connection may include a connection to one or more of a data connector, a clock connector, and a latch connector (e.g., using circuit board traces as connectors). Auto mode switcher 335 is also in electrical communication with synchronization signal connector 320 via electrical connection 340.

Auto mode switcher 335 may include a processor 345. Example processors include, but are not limited to, a microcontroller, embedded controller, CPU, digital signal processor, and any combinations thereof. In one example, auto mode switcher includes an AVR processor available from Atmel Semiconductor. Processor 345 and auto mode switcher 335 are shown in FIG. 3 as being separate circuit elements from transceiver 305. In an alternate embodiment, either a processor or any other part of auto mode switcher 335 may be combined in a in a single integrated circuit element with a transceiver. Examples of a combination processor and transceiver circuit include, but are not limited to, a CC1100 model chip and a CC1110 model chip both from ChipCon/TI.

Auto mode switcher 335 may also include a memory 350. Memory 350 may be integrated with or separate from auto mode switcher 335. In one example such as that shown in FIG. 3, auto mode switcher 335 includes a processor having a built-in memory. In another example, auto mode switcher 335 includes a processor having a memory that is separate from the processor but part of auto mode switcher 335. In yet another example, auto mode switcher 335 includes a processor that is part of auto mode switcher 335 and that is associated with (e.g., electrically connected with) a memory that is separate from auto mode switcher 335. It is contemplated that multiple memory elements (e.g., memory element 350) may be present in synchronizer 300.

In one example, a memory (e.g., memory 350) includes a machine readable medium. Examples of a machine readable medium include, but are not limited to, a random access memory, a read only memory, a memory drive device, an EPROM, an EEPROM, a compact disc (e.g., read only CD-ROM, writeable CD, re-writable CD, DVD, etc.), a magneto-optical disc and/or card, a flash memory (e.g., a thumb drive), a removable memory (e.g., a memory card, such as an SD-card), and any combinations thereof.

Memory 350 may include instructions 355 for causing a machine (e.g., processor 345) to perform any one of the methodologies of the present disclosure. In one example, memory 350 includes instructions 360 for programming transceiver 305 to a receive mode. Instructions 360 may include a digital receive frequency coding (e.g., a fractional N coding) or other structure representing a receive frequency of operation for a transceiver, such as transceiver 305. In one example, a digital receive frequency coding includes a 32-bit element that may be communicated (e.g., as a signal) to a transceiver to instruct the transceiver of the receive frequency to be utilized. In another example, memory 350 includes instructions 365 for programming transceiver 305 to a transmit mode. Instructions 365 may include a digital transmit frequency coding or other structure representing a transmit frequency of operation for a transceiver, such as transceiver 305. In one example, a digital transmit frequency coding includes a 32-bit element that may be communicated (e.g., as a signal) to a transceiver to instruct the transceiver of the transmit frequency to be utilized.

In one aspect, an instruction for setting a particular frequency for transmit or receive, (e.g., a digital frequency coding) may be provided in a variety of ways. In one example, an instruction for setting a particular frequency is set in one or more tables (e.g., a table stored in a memory, such as memory 350). In another example, an instruction for setting a particular frequency is calculated using an algorithm or other set of instructions (e.g., an algorithm stored in a memory, such as memory 350, and utilized by a processor, such as processor 345). A synchronizer may have an ability to use any number of frequencies for transmit and/or receive modes. In one example, a synchronizer includes instructions for a limited set of frequencies and/or the ability to calculate a limited set of such instructions. In another example, an algorithm provides an ability to determine an unlimited number of instructions for an unlimited number of frequencies. In yet another example, instructions for determining one or more frequencies for transmit and/or receive mode may be upgradeable (e.g., modifiable at a time after initial programming of a particular synchronizer).

In one embodiment, a synchronizer (e.g., synchronizer 300) transmits utilizing oscillator 310 operating on a first frequency and receives utilizing oscillator 310 operating on a second frequency (i.e., oscillator 310 in a receive mode is set at a frequency different from the transmit frequency for oscillator 310, such as in a heterodyne or a superheterodyne transceiver). In one example of such an embodiment, switching from a receive mode to a transmit mode requires instructing the synchronizer which frequency to utilize for transmit mode. A synchronizer may utilize one or more receive oscillator frequencies that are each offset from a corresponding transmit frequency by a set frequency difference. This difference is known as the intermediate frequency. In one example, a set frequency difference is about 200 kiloHertz (kHz). In one such example, to receive at a frequency of 300 MHz, the receive RF oscillator is set 200 kHz below or above the frequency of the signal to be wirelessly received (which is also the transmit frequency). In one aspect, a synchronizer may include one or more settings for instructing the synchronizer to utilize one or more predetermined channels. In such a case, a synchronizer may include a manual or electronic interface for a user to select a given channel of operation. In one example, a synchronizer includes four predetermined channels of operation, each including a frequency for wireless reception and a frequency of transmission (in some cases the same frequency as reception), which in turn determine the oscillator frequencies for transmit mode and receive mode. A given frequency for a channel may be determined by an algorithm or other instruction stored in a memory, such as memory 350. In another example, a synchronizer is configured to utilize a reception/transmission frequency including one or more frequencies between about 344 megahertz (MHz) and about 354 MHz, with channels spaced at about 0.5 MHz intervals and corresponding oscillator frequencies (e.g., frequencies of a transmit mode and a receive mode) offset from each other by about 200 kHz. In yet another example, a synchronizer is configured to utilize a reception/transmission frequency including one or more frequencies between about 433.4 MHz to about 434.4 MHz.

Synchronizer 300 may include an antenna 370. Transceiver 305 is shown in electrical communication with antenna 370 for providing wireless communication to and/or from transceiver 305. A variety of antennae are well known to those of skill in the art. Synchronizer 300 is shown with a module body 375. In one example, antenna 370 is external to module body 375. In another example, antenna 370 is internal to module body 375. In yet another example, antenna 370 is formed contiguously with module body 375.

Upon detecting a synch signal via a synchronization signal connector (e.g., synchronization signal connector 320, 320'), auto mode switcher 335 provides instructions to transceiver 305 and oscillator 310 to switch to a transmit mode. This process may occur in a variety of ways. As discussed above, instructions 365 may include instructions for a transmit frequency coding. Such a coding may also include an instruction that can be interpreted by the circuitry of transceiver 305 to set an operating mode to a transmit mode and use the frequency represented by the transmit frequency coding.

In one example of transceiver 305, transceiver 305 includes one or more configuration registers 380. In one example, transceiver 305 includes a configuration register 380 utilized by transceiver 305 for programming a frequency for transmission and reception. In such an example, instructions representing a frequency for transmission and/or reception (e.g., instructions 355, 360, 365) may be communicated to register 380 from a auto mode switcher 335.

In one embodiment of operation, synchronizer 300 is configured to load (e.g., load via serial connection and/or via serial shifting) an instruction, such as a configuration, for a receive frequency from auto mode switcher (e.g., from memory 350) to transceiver 305. This may occur at any point. In one example, oscillator 310 is set in a default state of a receive mode by shifting an instruction for a receive frequency to transceiver 305 at power on of synchronizer 300. Loading of an instruction for a given frequency may occur over one of the connections 315 (e.g., a data connection). In one example, each bit of an instruction (e.g, a 32-bit instruction) is loaded to a transceiver one at a time (e.g, one per clock cycle). In this example, a loaded instruction in transceiver 305 (e.g., a loaded instruction in register 380) does not set the current active operating mode of transceiver 305 and its oscillator 310. After loading an instruction (e.g., a receive frequency coding) for a receive frequency to transceiver 305, the instruction for the receive frequency is latched into configuration register 380. In one example, a latch instruction is provided from auto mode switcher 335 to transceiver 305 utilizing one of connections 315, such as a latch connection. In this example, once latched the instruction sets the current active operating mode of transceiver 305 and its oscillator 310. As discussed above, receive frequency coding may also include an indicator that transceiver 305 is to set an operating mode of a receive mode.

Switching oscillator 310 and transceiver 305 to a transmit mode may occur by a variety of ways. In one example, after latching of the instruction for the receive frequency into register 380, auto mode switcher 335 loads an instruction for a transmit frequency to transceiver 305 (e.g., loading corresponding data bits to register 380) but does not latch the instruction to register 380, thereby leaving transceiver 305 and oscillator 310 in a receive mode. This preloading may occur at any time prior to detecting a synch signal (e.g., upon receiving a trigger command, such as a trigger command from a trigger 390 of camera body 325). In a preloading example, by pre-loading the instruction for a transmit frequency to transceiver 305, the time required to do so is saved at the time of switching to a transmit mode. When a synch signal is detected via a synchronization signal connector (e.g., synchronization signal connector 320, 320') from camera body 325, auto mode switcher 335 provides an instruction and/or a connection signal (e.g., an electric pulse) to transceiver 305 to latch the pre-loaded instruction for a transmit frequency to register 380. This switches transceiver 305 and oscillator 310 (and thus synchronizer 300) to a transmit mode. Any additional necessary instructions for switching to and/or from a given receive and/or transmit mode (e.g., a TX bit, an RX bit) may also be communicated to transceiver 305 at the time of switching to a given mode. In one example, this instruction is included as part of the transmit and/or receive frequency coding. In one example, instructions for latching an instruction for a transmit frequency (and any additional instructions necessary for switching to a transmit mode) are communicated to transceiver 305 in direct response to detection of a synch signal by auto mode switcher 335.

In another embodiment, an instruction to transceiver 305 to switch to a transmit mode (e.g., a frequency coding) may be loaded into transceiver 305 (e.g., via loading into register 380 without latching the data to register 380) in larger word lengths than one bit. For example, a 32-bit frequency coding may be loaded to register 380 8-bits per instruction cycle of processor 335. This reduces the time required for loading to approximately 4 instruction cycles plus one instruction cycle to instruct register 380 to latch the values. In such an example, pre-loading of the frequency coding may occur, but is not necessary, prior to detecting a synch signal from camera 325.

It is to be noted that the above described aspects and embodiments may be conveniently implemented using a conventional processing device (e.g., processor 345) programmed according to the teachings of the present specification, as will be apparent to those skilled in the computer art. Appropriate software coding (i.e., instructions) can readily be prepared by skilled programmers based on the teachings of the present disclosure, as will be apparent to those skilled in the software art.

Such instructions may be included on a machine readable medium including stored computer code which is used to program a processing device to perform the disclosed function and process of the present disclosure. Examples of a machine readable medium include, but are not limited to, a random access memory, a read only memory, a memory drive device, an EPROM, an EEPROM, a compact disc (e.g., read only CD-ROM, writeable CD, re-writable CD, DVD, etc.), a magneto-optical disc and/or card, a flash memory (e.g., a thumb drive), a removable memory (e.g., a memory card, such as an SD-card), and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of wirelessly communicating a camera synchronization from a camera body to a remote device with a wireless camera flash synchronizer connected to a synchronization connector of the camera body, the wireless camera flash synchronizer including a transceiver having an oscillator element having a wireless receive mode and a wireless transmit mode, the oscillator element configured to be in only one of the wireless receive mode and wireless transmit mode at a time, the method comprising:
   setting the oscillator element to the wireless receive mode;
   detecting a synch signal from the synchronization connector of the camera body;
   in response to said detecting of the synch signal, automatically switching the oscillator element from the wireless receive mode to the wireless transmit mode; and
   wirelessly transmitting a synchronization data from the wireless camera flash synchronizer to the remote device.

2. A method according to claim 1, wherein said detecting a synch signal occurs via a physical connection of the wireless camera flash synchronizer and a hotshoe connector of the camera body.

3. A method according to claim 1, wherein said detecting a synch signal occurs via a physical connection of the wireless camera flash synchronizer and a PC connector of the camera body.

4. A method according to claim 1, wherein said wirelessly transmitting a synchronization data is completed using a single chosen frequency modulated for each completed transmission.

5. A method according to claim 1, wherein said setting step comprises:
   loading the transceiver with a receive frequency coding; and
   latching said receive frequency coding into a configuration register of the transceiver.

6. A method according to claim 5, further comprising:
   loading the transceiver with a transmit frequency coding after said loading of the receive frequency coding and before said detecting of the synch signal.

7. A method according to claim 6, wherein said automatically switching step comprises latching the transmit frequency into the configuration register.

8. A method according to claim 1, further comprising:
   determining a receive frequency coding and a transmit frequency coding at about the time of powering on the wireless camera flash synchronizer; and
   storing the receive frequency coding and the transmit frequency coding.

9. A method according to claim 1, wherein said automatically switching step is completed and said transmitting step commences in less than about 1 millisecond.

10. A method according to claim 1, wherein said automatically switching step is completed and said transmitting step commences in less than about 100 microseconds.

11. A method according to claim 1, wherein said automatically switching step is completed and said transmitting step commences in less than about 20 microseconds.

12. A wireless camera flash synchronizer comprising:
   a transceiver having an oscillator element having a transmit mode and a receive mode, said oscillator element being in only one of said transmit mode and said receive mode at a time;
   a first synchronization signal connector for connecting said transceiver to a second synchronization signal connector of a camera body; and
   an auto mode switcher for switching said transceiver from said receive mode to said transmit mode in response to said first synchronization signal connector receiving a synch signal from said camera body.

13. A synchronizer according to claim 12, wherein said transceiver is configured to transmit a synchronization data based upon said synch signal completely to a remote device using a single chosen frequency for each complete transmission.

14. A synchronizer according to claim 12, wherein said first synchronization signal connector comprises a connection element configured to connect to at least one of a camera body hotshoe and a camera body PC connector.

15. A synchronizer according to claim 12, wherein said second synchronization signal connector comprises a connection element selected from the group consisting of a camera body hotshoe and a camera body PC connector.

16. A synchronizer according to claim 12, wherein said transceiver comprises a configuration register for receiving a frequency coding from said auto mode switcher.

17. A synchronizer according to claim 16, wherein said auto mode switcher is configured to load a receive frequency coding to said single transceiver and latch said receive frequency coding to said configuration register; load a transmit frequency coding to said single transceiver after latching said receive frequency coding and before receiving said synch signal; and to latch said transmit frequency to said configuration register upon receiving said synch signal.

18. A synchronizer according to claim 12, wherein said auto mode switcher is configured to switch said oscillator from said receive mode to said transmit mode in a first amount of time that is less than about 1 millisecond of said first synchronization signal connector receiving said synch signal from said camera body, and wherein when said oscillator is set to said transmit mode, said transceiver is ready to wirelessly transmit a synchronization data to a remote device.

19. A synchronizer according to claim 18, wherein said first amount of time is less than about 100 microseconds of said first synchronization signal connector receiving said synch signal from said camera body.

20. A synchronizer according to claim 18, wherein said first amount of time is less than about 20 microseconds of said first synchronization signal connector receiving said synch signal from said camera body.

\* \* \* \* \*